United States Patent [19]
Jensen

[11] 4,126,950
[45] Nov. 28, 1978

[54] TEACHING APPLIANCES FOR PROGRAMMED TEACHING

[76] Inventor: Cornelius Jensen, D-2251 Sollwitt, Fed. Rep. of Germany

[21] Appl. No.: 783,747

[22] Filed: Apr. 1, 1977

[30] Foreign Application Priority Data

Apr. 2, 1976 [DE] Fed. Rep. of Germany ....... 2614218

[51] Int. Cl.² ............................................. G09B 3/00
[52] U.S. Cl. .................................................. 35/48 R
[58] Field of Search .................... 35/48 R, 48 A, 48 B

[56] References Cited

U.S. PATENT DOCUMENTS

| | | | |
|---|---|---|---|
| 2,080,150 | 5/1937 | Peterson et al. | 35/48 A |
| 2,503,130 | 4/1950 | Poritz | 35/48 R |
| 2,954,616 | 10/1960 | Mogard | 35/48 R |
| 3,099,095 | 7/1963 | Fallingborg et al. | 35/48 R |
| 3,165,319 | 1/1965 | Benima | 35/48 A X |
| 3,212,201 | 10/1965 | Jensen | 35/31 D |

FOREIGN PATENT DOCUMENTS

618,778 2/1949 United Kingdom ..................... 35/48 R

*Primary Examiner*—William H. Grieb

[57] ABSTRACT

This invention relates to teaching appliances for programmed teaching of the kind including a laying-out board and answer tablets and means for securing the tablets against lateral displacement, the tablets being laid on the board in a prescribed fashion. According to the invention, the laying-out board rests on a support having checking projections and can be brought into a raised laying-out position to allow the answer tablets to be laid down, and into a lowered checking position to allow the answers to be checked; furthermore, when the laying-out board is in the checking position, the checking projections project through the board from below and, in the case of correctly laid tablets, fit into checking holes in the tablets while, in the case of incorrectly laid tablets, strike against the undersides of the tablets and prevent them from lying flat.

16 Claims, 12 Drawing Figures

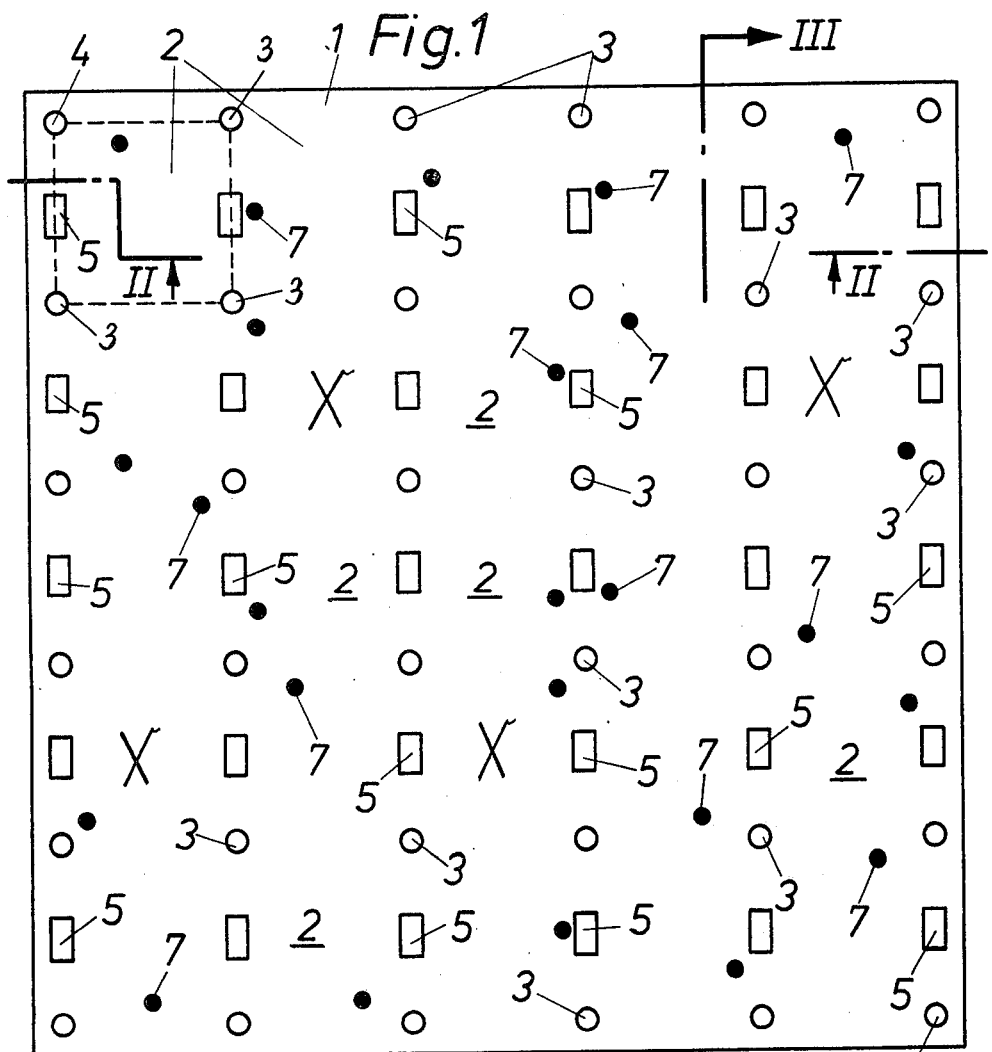
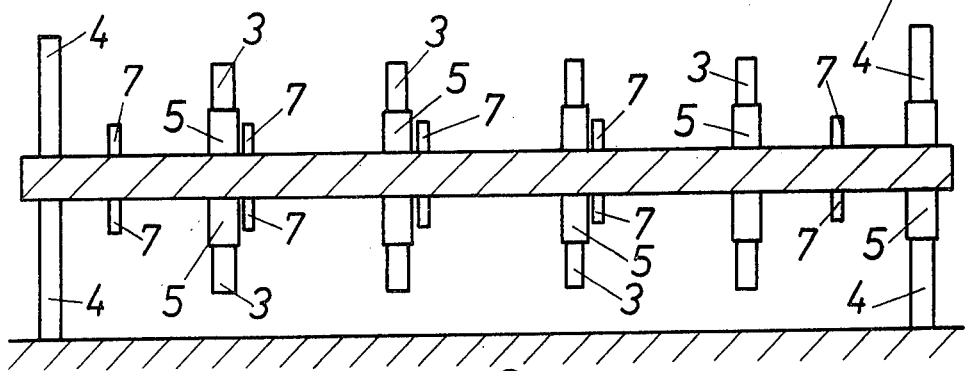

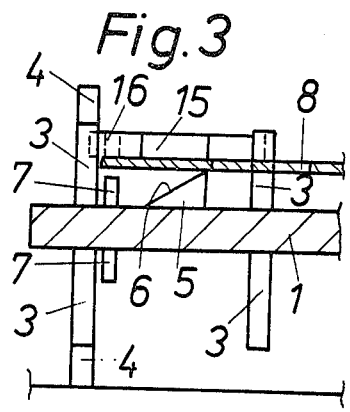
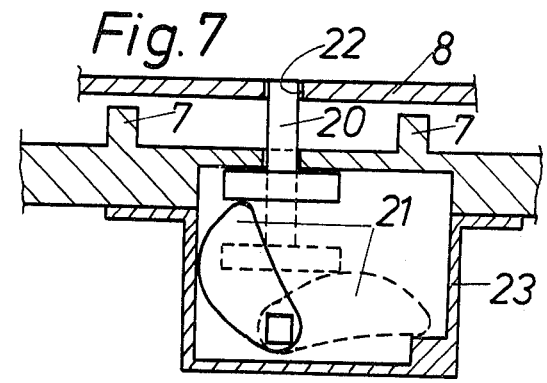
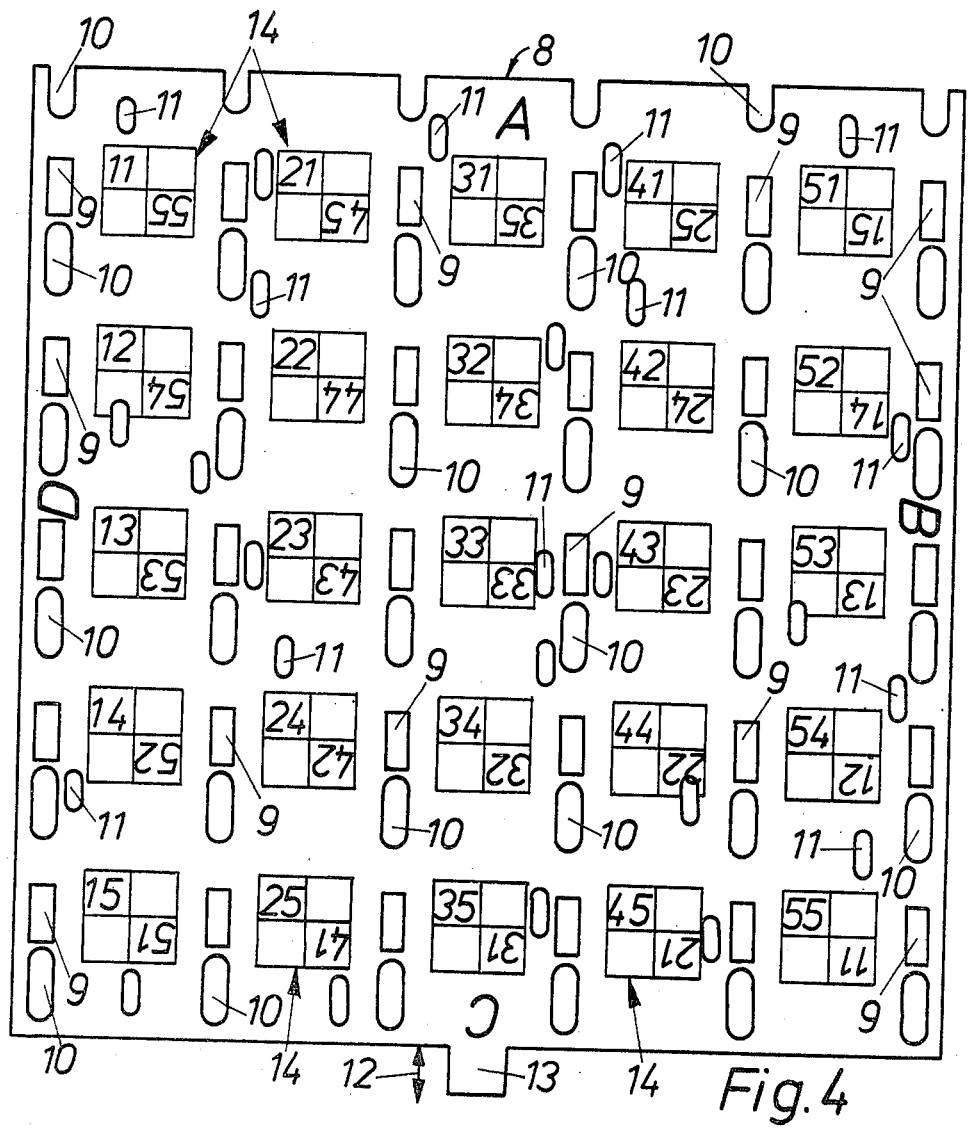

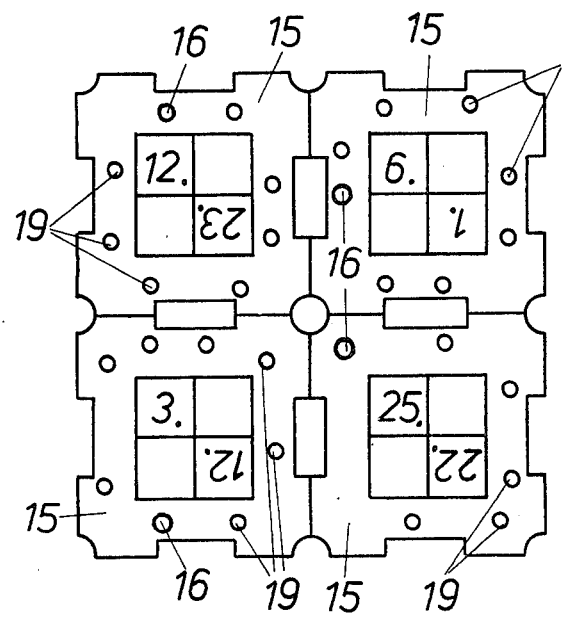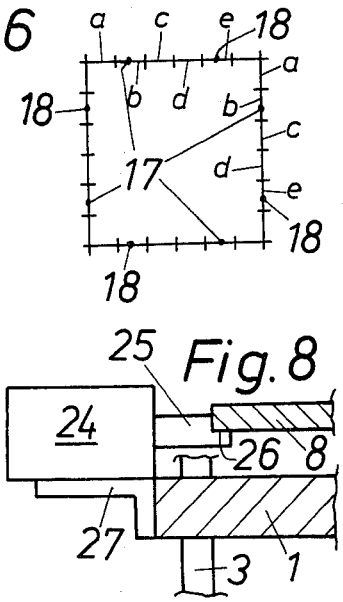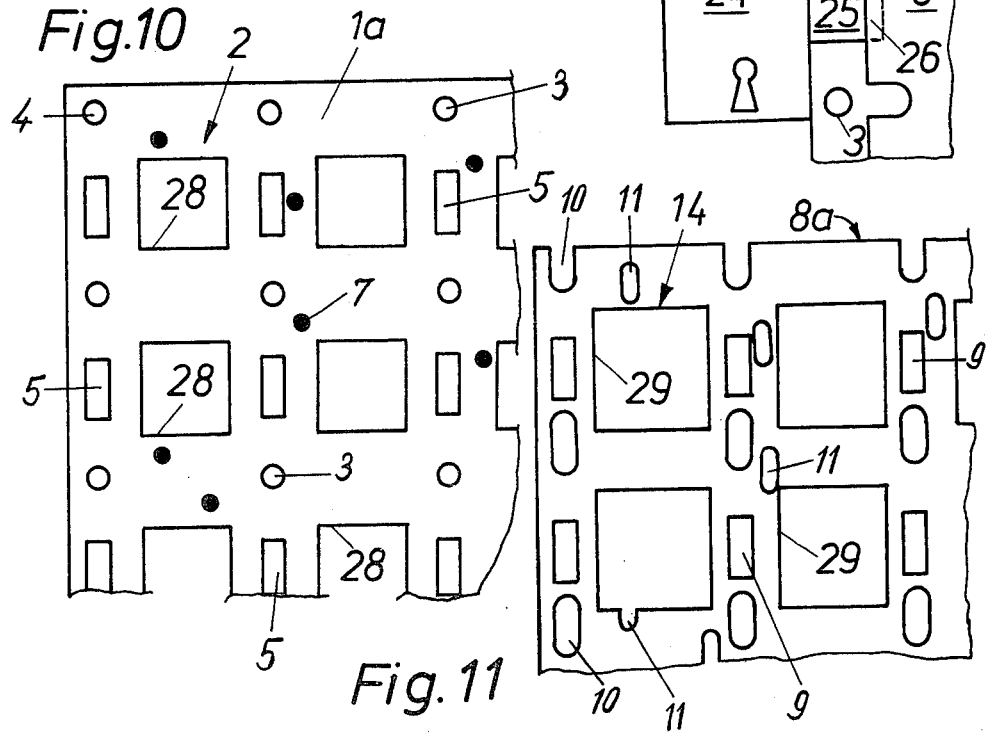

4,126,950

TEACHING APPLIANCES FOR PROGRAMMED TEACHING

BACKGROUND OF THE INVENTION

The present invention relates to a teaching appliances for programmed teaching of the kind which includes a laying out board and answer tablets which are to be laid on the board in a prescribed fashion and wherein means are provided to secure said tablets against lateral displacement.

In a known teaching appliance of the kind described above for programmed teaching, in which two opposing edges of the tablets are of an undulating configuration so that pairs of the tablets will fit together, it is not possible to check the correctness of the answers which have been given until after a certain stage has been reached. This only becomes possible when a tablet being laid has to be laid down abutting a tablet already down. If when this is done it is found that the undulations of the tablet being laid down will not fit into those of the tablet already down, the wrong answer has been given to the question corresponding either to the tablet already laid or to the tablet about to be laid. As a rule, the question corresponding to the tablet already laid has then to be answered again and only then can that corresponding to the other tablet be answered. It is true that this is a sure way of showing up a wrongly answered question, but on the other hand the questions concerned have first to be answered correctly, that is to say the tablets have to be laid down correctly, before other tablets can be laid down abutting them. Admittedly, all the questions will eventually be correctly answered in this way once all the tablets have been laid down, but because of incorrectly answered questions it may take a very long time to get all the tablets laid down and as a result children may lose interest in answering all the questions. Also when all the questions have been answered, there is no way of finding out how many questions were answered incorrectly and which these were.

It is an object of the invention to provide a simply constructed teaching appliance with which the questions already answered can be checked at any time and it can at once be determined, if desired, how many questions have been wrongly answered and which these are, and which is almost completely proof against cheating. The intention is also to provide a relatively large number of possible codings with a comparatively small number of tablets.

SUMMARY OF THE INVENTION

In a teaching appliance of the kind referred to in the preamble hereto, this and other objects are by the invention which consists in that said board rests on a support having checking projections and is movable into a raised laying out position to allow the answer tablets to be laid down and into a lowered checking position to allow the answers to be checked, and wherein, when the laying out board is in the checking position the checking projections project through the board from below and, in the case of correctly laid tablets, fit into checking holes in the tablets and, in the case of incorrectly laid tablets, strike against the undersides of the tablets and prevent them from lying flat.

Advantageously, each answer tablet has one checking hole and each laying space on the laying out board has one checking projection allocated to it, the checking projections being so arranged that by being rotated to one of four positions 90° apart for example, or by being turned over, one and the same answer tablet can be laid in four different spaces. Preferably, ramps are provided on the board-like support and corresponding apertures in the laying out board so that the laying out board, when moved relative to the support, can be brought into the laying out position by the ramps, the laying out board having slots which extend in the direction in which it is moved to allow free passage to the checking projections on the support so that when the laying out board is raised the checking projections are concealed by the board. Preferably, each answer tablet also has a plurality of dummy holes.

This version of the teaching appliance enables the answers to the questions to be quickly checked at any time since all that has to be done for this purpose is to push back the laying out board. If the answer tablet or tablets remain lying flat as the board descends, i.e. if the corresponding checking projection or projections enter the checking hole or holes in the tablet or tablets, then the question or questions have been answered correctly. If one or more of the checking projections do not engage in a checking hole, then as the laying out board is lowered they strike against the underside of the answer tablet or tablets concerned and prevent it or them from lying flat, which shows that the particular answer or answers are wrong. The number of unlowered tablets at once shows the number of questions which have been wrongly answered. Since the blocks are numbered in the normal way and the number indicate the particular questions involved, it is also at once clear which questions have been incorrectly answered.

There is also a very high degree of security against cheating since when the laying down board is in the raised position there are no control projections projecting through it, nor are any of them visible through their associated slots in the board because they are concealed by the board itself as a result of its displacement. Thus all the tablets can be laid down flat on the board when it is in the laying down position, and as a result, to lay down any particular tablet correctly, the question involved has to be answered by mental effort.

An appliance according to the invention can also be used when the number of questions making up a group of questions is smaller than the number of tablets in the set provided with the appliance, given that the correctness of the answer to a question is found by applying the principle according to the invention of a checking projection which engages in a checking hole in a tablet.

BRIEF DESCRIPTION OF THE DRAWINGS

Further advantages of the invention will be seen in the following description, in which the invention is explained in greater detail with reference to an embodiment and in conjunction with the accompanying drawings in which:

FIG. 1 is a plan view of a support for the appliance according to the invention, FIG. 2 is a section on line II—II of FIG. 1, FIG. 3 is a partial section on line III of FIG. 1, FIG. 4 is a plan view of a laying out board for an appliance according to the invention, FIG. 5 is a plan view of four answer tablets laid next to one another, FIG. 6 shows a system for determining the positions of checking projections and checking holes, FIG. 7 is a sectional view of a locking device, FIGS. 8 and 9 are a sectional view and a plan view of a further locking device, FIGS. 10 and 11 are partial plan views of further embodiments of the support and the laying out board respectively.

DETAILED DESCRIPTION OF PREFERRED EMBODIMENTS

Figure 12:
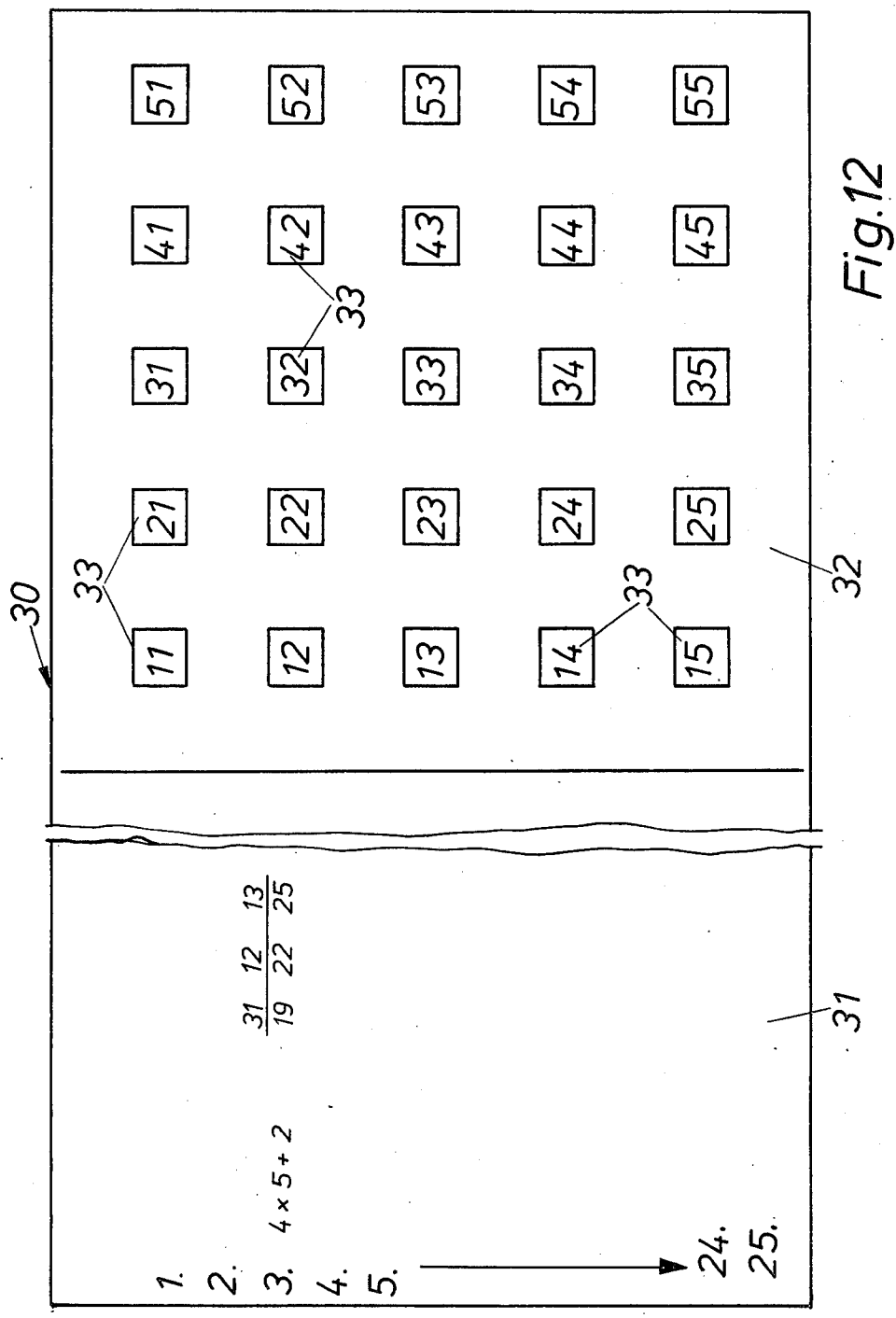
FIG. 12 shows a lesson chart having an answer section according to the invention.

As shown in FIG. 1, the embodiment of teaching appliance includes a board-like support 1 having for example 25 similar, square areas 2 which adjoin one another in all directions and whose positions are defined by pegs 3 situated at the corners of the areas. The four pegs 4 at the corners of the support 1 are advantageously longer than the other pegs 3 so that lesson charts can be placed under the support, as will be explained. The areas 2 are so distributed on the support that they in turn also form a square. The support is also equipped with a plurality of ramps 5 which are situated between the pegs forming the vertical rows, which ramps may be provided one between each two pegs as shown. All the ramps 5 are similarly arranged, that is to say they all extend in the same direction (FIG. 1) and their slopes 6 are also arranged to face in the same direction (FIG. 3).

Each area 2 on the support 1 contains a peg-like checking projection 7. The position of each of the checking projections is determined by a system which will be explained below and each checking projection fits into a checking hole in one of a plurality of yet to be described answer tablets, the checking holes being positioned by the same system. The height of the peg-like checking projections is less than that of the ramps 5.

It can be seen from FIG. 2 that the underside of the support 1 is also provided with pegs 3, 4, ramps 5 and checking projections 7, thus enabling the other side of the support to be used also. In this case the checking projections 7 may be arranged on the underside in such a way that when the support is turned over they are situated in the same positions as the projections shown in FIG. 1. They may however also be situated in the same positions on the underside of the support as the pegs on the upper side of the support, as shown in FIG. 2. Finally, the positions of the projections 7 on the underside of the support may bear no relation to the positions of the pegs on the upper side. The fact that both sides of the support can be utilised increases the usefulness of the teaching appliance.

FIG. 4 shows a laying out board 8 which is placed on the support 1 and which has the appropriate openings for this purpose. Since the board 8 is intended to be raised from the support by displacement relative to it in order to bring it to the raised laying out position, the openings consists of apertures 9 for the ramps 5 and of slots 10 and 11 for the pegs 3, 4 and the checking projections 7 respectively. The checking projections are designed for transversal movement through laying out board 8. Arrow 12 indicates the direction of movement of the board 8, (for which purpose the board has a tab 13) and the openings extend in the same direction. The board 8 thus has laying spaces 14 whose positions correspond to those of areas 2, there being 25 such spaces in the present embodiment on which answer tablets are to be placed in a specific fashion as will be explained below.

FIG. 5 shows four adjoining answer tablets 15 each of the same size as one of the laying spaces 14 on board 8, these tablets being cut out around their peripheries to allow for the pegs 3, 4 and ramps 5, so that they are held in position at the sides and can be fully lowered with the laying out board. Twenty-five such answer tablets are provided to match the number of spaces on the laying out board.

In order that the answer tablets, assuming them to be correctly laid down, can be lowered the whole way down with the laying out board, all except one of them have a checking hole 16 to receive one of the checking projections 7 on the support 1. The checking projections 7 are so distributed relative to one another in the areas 2 that one and the same tablet can be laid in various spaces 14 on the laying out board 8. In the embodiment shown, 24 of the answer tablets can each be laid in four different spaces. As an example the tablet at the bottom right of FIG. 5 can be laid in the spaces 2 on the support which are marked X in FIG. 2 in angular positions which differ by 90°. It is of course clear that the areas in which the projections 7 involved in each particular case are situated may not be located close together.

To find the various positions for the checking projections in the areas and for the checking holes in the answer tablets, a common, closed outline of regular shape is advantageously used as a basis. In the present example it is a square (FIG. 6). Each side of the square is divided up symmetrically, that is to say into an equal number of unit divisions matching the number which, when squared, gives the number of tablets. Since this number is five in the present embodiment, there are five unit divisions $a$ to $e$, which are of equal length in the present case, and there are thus six checking holes per side of the square, that is to say a total of 24 checking holes. Since in the present case the unit divisions are all of the same length, the position in any particular case can be calculated from $n$ times one unit division.

Since the scheme described above makes no provision for a checking hole for one of the 25 answer tablets, this tablet alone is provided with at least four checking holes 17 which lie at equal distances from each corner of the plotting square in FIG. 6, although the distances in question may not be equal to one or more of the unit divisions mentioned. There is also a suitably situated checking projection 7 provided in one of the 25 areas 2 on the support 1. This admittedly means that one of the tablets will always be laid in the same space 14, but with 90° differences of orientation. In order that this tablet also can be used the other way up, there are four other checking holes 18 provided at equal distances from the other corners of the plotting square.

By reason of the arrangement of the checking projections and checking holes described above, all the tablets, with one single exception, can each be laid down in four different spaces, or in other words all the spaces except one will accept four different tablets.

To make it more difficult to decide how to lay the tablets 15, they each preferably have a plurality of dummy holes 19 whose diameter cannot be distinguished by eye from that of the checking holes 16 and whose positions do not exactly conform to the units of division $a$ to $e$ (FIG. 5). This prevents the tablets being matched up with the slots 11 in the laying out board 8, thus preventing cheating. The board 8 may also have dummy slots but these have not been shown as their disposition may take any desired form and a showing of them would not contribute to any greater understanding of the invention.

The slots 11 for the projections 7 are shorter than the slots 10 for the pegs 3, the reason for this, leaving aside the inclination of the ramps, being the comparative shortness of the projections. This means that the projections are entirely concealed by the laying out board 8 when the board is in the raised position shown in FIG. 3. In this position the board has been pulled forward to such a degree that it is resting on the tops of the ramps 5 and will thus remain in the raised position.

In order that the laying out board 8 can be fixed in the raised position (the laying out position) when the proposed appliance is being used for teaching, a locking device may be provided. As shown in FIG. 7, there is provided for this purpose at a suitable point along the edge of the support 1 a locking catch 20 which can be raised and lowered and which is actuated and locked in position by a cam member 21. The locking catch 20 engages in a hole 22 in board 8 when the latter is in the raised position. The cam member is for example rotatably mounted in a housing 23 connected to the support and can only be operated by a removable key or the like, so that only the teacher is able to check the answers.

FIGS. 8 and 9 show another locking device in the form of a sliding-bolt lock 24 whose bolt 25 has a shoulder 26 which locks the board 8 in the raised position. The lock is secured to the support 1 by an angle bracket 27.

Although the laying out board 8 can be used to answer a number of questions with each coding scheme, as will be explained, its uses can be extended by giving it further slots 11 which are so arranged that when turned over it can still be used on the same side of the support 1. The proposed appliance may be made even more versatile by providing a plurality of laying out boards 8 and/or sets of answer tablets.

To utilise a lock-laying teaching appliance in accordance with the invention use is made in a known way of combinations of code numbers. The answer tablets in the present embodiment are given a number from 1 to 25 and in the question chart one question is assigned to each tablet number. Each question in a group of questions is allotted three numbers for example, one of which is the code number allotted to the correct answer. The code numbers used for a group of questions are also the numbers of the places on the laying out board 8, the place numbers adopted in the present instance being the first five numbers of successive tens groups.

The appliance is situated in position A when the letter A shown in FIG. 4 can be read normally in which case the numbers which apply to the spaces 14 on the laying out board 8 are those which are likewise able to be read normally. The same applies to the positions B, C and D of the appliance and to the associated numbers of the laying out places. The upside down numbers belong to position C, which is reached when the appliance has been turned through 180°, when the numbers of the spaces are those which can be read normally.

Since, in the case of the appliance shown, there are four different ways of laying the answer tablets, then with the appliance in a given position there are thus four coding systems for each side of the laying out board 8, which systems can be used four times because of the four possible positions of the appliance. Like the spaces 14 on the laying out board 8, which each have four numbers, the answer tablets 15 are also numbered four times from 1 to 25, with the numbering of the blocks differing visually in accordance with the coding system and/or the combination of code numbers. The tablets may also carrying four numbers on their reverse sides since by reason of the position of their checking holes they may also be used the other way up. The result is that a relatively small number of tablets can be coded to correspond to an extremely large number of questions and it is therefore impossible to learn their possible positions by heart.

To expand the possibilities of using the coded numbers, the laying out board may also be numbered on its reverse side so that, when turned over, it can be used with the same set of tablets either on the same side of the support or else on the other side of the support when the latter has also been turned over. Finally, other code numbers and tablet numbers could be used in conjunction with other laying out boards and/or sets of tablets with a single support.

The other laying out boards may also be boards without tabs 13. When in use, such a laying out board is placed on top of a laying out board 8 having a tab 13. For this purpose all the pegs and checking projections are made slightly longer if necessary.

In an alternative embodiment, the appliance may be so formed that the laying out board 8 has the ramps 5 on its underside and the support 1 then contains the corresponding apertures 9 for the ramps.

The appliance is used as follows. First, the laying out board 8 is moved to the raised laying out position shown in FIG. 3 by pulling on the tab 13 and if required is locked by means of the locking catch 20 (FIG. 7). In this position the checking projections 7 do not project through the board 8 (FIG. 3) and are concealed by the board, so that any tablet can be placed in any space on the board. If with the appliance in position A the pupil has correctly answered, for example, the questions numbered 3, 6, 12 and 25, these also being the numbers of the tablets, then for example the four tablets must have been placed as in FIG 5, that is to say in the four spaces at the top left of the laying out board in FIG. 4, as a comparison with the support 1 in FIG. 1 will show where the position of the corresponding checking projections 7 can be seen. If the laying out board is slid back together with the tablets so laid, then all four of the tablets will travel right down with the board, the checking projections entering the checking holes in the tablets and thus indicating that the answers are correct.

If in the course of answering the questions certain tablets are laid down incorrectly, then when the laying out board is lowered the corresponding checking will strike against the incorrectly placed tablets from below and will prevent them from lying flat, this making them clearly distinguishable from the others which have been lowered flat. The number of incorrect answers can then at once be counted and it can be seen from the numbers of the tablets which questions have been incorrectly answered. A check on the answers can be made at any time by lowering board 8, unless the board is locked, when only the teacher is able to unlock it in order to see how well the pupil has done.

In another embodiment of the invention, the appliance is formed in such a way that it can be used with a suitably adapted lesson chart. FIGS. 10 and 11 show a support 1a for this purpose, the areas 2 of which are provided with window-like viewing apertures 28, and a laying out board 8a whose laying out spaces 14 also have window-like viewing apertures 29. Similarly, the lesson chart 30 shown in FIG. 12, in addition to a question section containing the questions, which is preferably on its left hand side, has on its right hand side an answer 32 containing answer boxes 33. The answer boxes 33 are at a distance from one another such that when the lesson chart is placed under the support 1a they can be seen through the apertures 28 and 29 in the support and the laying out board 8a. Alternatively, the support 1a and the laying out board 8a may consist of a transparent material. It is also advantageous to combine a plurality of lesson charts 30 into a book so that the teaching material is available in a classified form graduated in increasing degrees of difficulty.

This embodiment is highly suitable for pupils beginning their schooling since the answer boxes 33 in the answer section 32 may contain so-called plain language answers, that it to say the plain-language answer to the associated question can be seen in the particular answer box. Alternatively, there may of course be code numbers in the answer boxes as shown in FIG. 12.

In yet another embodiment, it is not vital for the appliance, when used in combination with a lesson chart as described above which is placed under the appliance, to have a support with checking projections, tablets with checking holes and a lowerable out board. It is enough for the board-like support to consist of a transparent material and to be so formed that the answer tablets, which are now laid directly onto the support, are secured against sideways displacement after being laid, and for the laying spaces for the tablets to be situated on the support to match the positions of the answer boxes on the teaching chart. When this is the case the tablets are of irregular contour along two opposing edges, so that, when the tablets are being laid the correctness of the answers to the questions is checked on the known interengagement principal where the interengaging portions of tablets which are laid next to one another in any particular case fit into each other only when the tablets have been correctly laid.

I claim

1. In a teaching appliance for programmed teaching of the kind including a laying out board and answer tablets and means for securing said tablets against lateral displacement, said tablets being laid on said board in a prescribed fashion, the invention which comprises a support member for supporting said laying out board, said support member having checking projections transversing said board and said answer tablets being provided each with a checking hole for receiving said checking projections, said laying out board being movable to a raised laying out position so as to allow said answer tablets to be laid down, and to a lowered checking position so as to allow said answer tablets to be checked, said checking projections projecting through said laying out board from below when said board is in the checking position, and said checking projections fitting into said checking holes in said tablets when the same are correctly laid down on said board.

2. An appliance according to claim 1, wherein each laying space on said laying out board is allocated one checking projection, said checking projections being so arranged that the same answer tablet can be laid in different spaces on said board by rotating it or turning it over.

3. An appliance according to claim 2, wherein the position in each case of said checking projection and said checking hole is found by using as a basis a common, closed outline of regular shape which is divided up into sections of equal length which are symmetrically subdivided into unit divisions, any particular position being found by an appropriate addition of unit divisions.

4. An appliance according to claim 3, wherein, when the number of tablets per appliance is a square of a number, the outline forms a square, and each side of the square is divided up into unit divisions equal in number to the square root of the number of tablets, to enable the various positions for said checking holes and said checking projections to be found.

5. An appliance according to claim 1, wherein ramps are provided on said support member, and said laying out board has apertures for receiving said ramps so that, moving said laying out board by means of said ramps relative to said support member, brings said laying out board into the raised laying out position, and wherein said laying out board has slots extending in its direction of movement to allow free passage to said checking projections on said support, so that when said laying out board is raised, said checking projections are concealed by said board.

6. An appliance according to claim 5, wherein each said answer tablet also has a plurality of dummy holes.

7. An appliance according to claim 5 which is further provided with a locking device to lock said laying out board in the raised position, said device being operable be means of a separate actuating member.

8. An appliance according to claim 7, wherein said locking device comprises of a locking catch which is movable into engagement with said laying out board from below through said support member, and of a cam member which operates said catch and locks it in position.

9. An appliance according to claim 7, wherein said locking device comprises of a sliding-bolt lock.

10. An appliance according to claim 5, wherein the reverse side of said support member is also provided with devices for securing said answer tablets in position, said devices being so arranged that said laying out board can be used either way up.

11. An appliance according to claim 10, wherein said devices comprises ramps and checking projections.

12. An appliance according to claim 5, wherein said laying out board is provided with further slots for said checking projections which are so arranged that the laying out board can be used on the same side of the support member when turned over.

13. An appliance according to claim 5, which further includes a plurality of laying out boards and sets of answer tablets.

14. An appliance according to claim 1, wherein said support member and said laying out board are formed of a transparent material and have viewing apertures, and said appliance further includes a lesson chart having a question section and an answer section with answer boxes, said answer boxes being so arranged that when the answer section is placed under the support member, they can be seen through the viewing apertures of the support and laying out board.

15. An appliance for programmed teaching which has a laying out surface and answer tablet to be laid out thereon in a prescribed fashion, said tablets having edges that are non-straight and being secured against lateral displacement, said laying out surface comprising a support member made of transparent material, and said appliance further including a lesson chart having a question section and an answer section with answer boxes, said answer boxes, being provided with space numbers and plain language answers, and being so arranged that they can be seen through said support member when said section is placed under said support member.

16. An appliance according to claim 15, further comprising a plurality of lesson charts which are combined into a book.

* * * * *